United States Patent [19]
Frichtel et al.

[11] Patent Number: 5,805,976
[45] Date of Patent: Sep. 8, 1998

[54] SINGLE SITE, SPLIT LOCATION TRUNKED RADIO COMMUNICATIONS SYSTEM

[75] Inventors: John S. Frichtel, Lynchburg; Robert O. Canada, III, Bedford; Kennard N. Gwin, Lynchburg, all of Va.

[73] Assignee: Ericsson Inc., Research Triangle Park, N.C.

[21] Appl. No.: 715,397

[22] Filed: Sep. 18, 1996

Related U.S. Application Data

[62] Division of Ser. No. 340,345, Nov. 14, 1994, Pat. No. 5,752,198.

[51] Int. Cl.⁶ ............................... H04B 3/36; H04B 7/00
[52] U.S. Cl. ............................. 455/8; 455/508; 455/509; 455/520
[58] Field of Search .............................. 455/507, 508, 455/509, 517, 518, 520, 524, 525, 8, 11.1, 16; 370/315, 327, 340, 341

[56] References Cited

U.S. PATENT DOCUMENTS

| | | |
|---|---|---|
| 4,266,183 | 5/1981 | Steensma et al. . |
| 4,441,180 | 4/1984 | Schüssler . |
| 4,521,912 | 6/1985 | Franke et al. . |
| 4,823,280 | 4/1989 | Mailandt et al. . |
| 4,905,302 | 2/1990 | Childress et al. . |
| 5,086,506 | 2/1992 | Hall et al. . |
| 5,123,110 | 6/1992 | Grube . |
| 5,175,866 | 12/1992 | Childress et al. . |
| 5,305,467 | 4/1994 | Herndon et al. . |
| 5,313,652 | 5/1994 | Rozenstrauch et al. . |
| 5,418,785 | 5/1995 | Olshansky et al. . |
| 5,422,885 | 6/1995 | Nadkarni . |
| 5,446,924 | 8/1995 | Christian et al. . |
| 5,471,649 | 11/1995 | Rees et al. . |
| 5,491,835 | 2/1996 | Sasuta et al. . |
| 5,517,232 | 5/1996 | Heidemann et al. . |
| 5,535,426 | 7/1996 | Leigh et al. . |

OTHER PUBLICATIONS

*Motorola Technical Developments*, vol. 13, Jul. 1991, Schaumburg, Illinois, US, pp. 77–78, XP 000259229, G. Grube, "Site Shared Wide Area Trunked Network".

*Primary Examiner*—Nguyen Vo
*Attorney, Agent, or Firm*—Nixon & Vanderhye P.C.

[57] ABSTRACT

Base stations located at physically separate, remote locations are operated as a single site to permit trunked radio communications between portable radios located at those split sites. A first trunked RF communication site located at a first split site location includes plural first base stations, each first base station including a transceiver corresponding to an RF communications channel. The first site also includes a first site controller, connected to each of the first base stations, for assigning base station transceivers to radios requesting an RF communications channel. A second trunked RF communications site is located at a second split site location remote from the first split site location and includes plural second base stations along with a second site controller. A communication link links the first and second split sites so that they function as a single site trunked radio communications system with one of the first and second site controllers assigning the first and second base station transceivers to radios requesting RF communications channels.

13 Claims, 6 Drawing Sheets

SINGLE SITE, SPLIT LOCATION TRUNKED RADIO COMMUNICATIONS SYSTEM

This is a division of application Ser. No. 08/340,345, filed Nov. 14, 1994, now Pat. No. 5,752,498.

RELATED APPLICATIONS

This application is also related to related application entitled "Power Monitoring System For A Single Site, Split Location Trunked Radio Communications System" filed on Nov. 14, 1994, as Ser. No. 08/340,346, filed Nov. 14, 1994.

BACKGROUND AND SUMMARY OF THE INVENTION

This invention is directed to trunked radio repeater systems, and more particularly describes a trunked radio communication system where trunked RF base station repeaters located at remote site locations are operated as a single site.

An example of a trunked radio repeater system is generally depicted in FIG. 1. Individual radio units are assigned to various groups. For example, all police officers could be assigned to one or more groups. Radio units of various groups communicate with each other within and outside of their own group using shared radio repeaters which are part of a trunked repeater system 100. A dispatch console 102 may be housed directly at the repeater system site 104 or may be remotely located via other communication facilities 106. In addition to groups including one particular type of personnel such as police officers, larger groups may establish efficient radio communications between individual radio units within many different agencies. For example, the police department may have a need to provide efficient communications between different units of its squad car force, different portable units assigned to foot patrolmen, different units of detectives or narcotics agents and the like. In accordance with trunking theory, a relatively small number of radio repeaters can efficiently service these types of needs within a given geographical area if they are shared on a "as needed" basis between all potential radio units, i.e. trunked.

The single site 100 is depicted in greater detail in FIG. 2. A common antenna 200 is utilized with conventional transmit combiner, receiver multicoupler, and duplexer circuitry 202 to transmit and receive RF communications using a plurality of duplex RF channel transmit/receive circuits included in a plurality of RF base station transceivers (BSTs) 204, 206 and 208. Each base station transceiver corresponds to a radio communications channel. Each base station transceiver is typically controlled by dedicated control shelf logic circuitry which is in turn controlled by microprocessor-based logic control circuits collectively referred to as trunking cards (TC) 210, 212, and 214.

All of the trunking cards 210, 212, and 214 communicate with a primary site controller 250 via control data buses 216(1), 216(2), and 216(3). Although the major intelligence and control capability for the trunking system resides within primary site controller 250, alternate backup and "failsoft" control functions are incorporated within the trunking cards 210–214 so as to provide continued trunked repeater service even in the event that the primary site controller 250 malfunctions or is otherwise taken out of service. The trunking card also receives hardwired inputs over from synchronization link (FSL) 226 and backup serial link (BSL) 228.

An optional telephone network interconnect may also be provided to the public switched telephone network (PSTN).

Typically, a system manager 220 is also provided for overall system management and control together with one or more dispatcher consoles 222.

A power monitor unit (PMU) 224 is co-located with the primary site controller 250 and the base station transceivers that PMU 224 monitors. The primary function of the power monitor unit 224 is to measure the RF power developed by active transmitters at each base station transceiver 204–208, and if the power from any transmitter is below a predetermined threshold, this fact is reported to the site controller. Typically, the power monitor unit 224 includes a microprocessor, a display unit, and analog to digital conversion circuitry. To measure transmitted RF power, a probe is placed in the wire cabling connecting each base station transmitter to the transmit/combiner circuitry 202. RF power from the probe is detected using a conventional diode detector where the voltage developed by the diode is proportional to the RF power generated by the base station transmitter. The A-to-D conversion circuitry is connected to each diode detector and converts the analog voltage into digital form for processing by the microprocessor.

Each time the primary site controller 250 makes a channel assignment, the power monitor unit 224 receives a "channel mask" indicating which RF channels are active along with one or more commands to measure the RF power developed by each active base station transmitter. In response to these commands, the power monitor unit microprocessor senses the analog to digitally converted voltage from the diode detector representing the RF power developed by each transmitter. The digitized power measurements are compared against the predetermined thresholds, and any active channel having an output power below the threshold is indicated to the site controller 250. Such low power transmissions are ended, and the site controller turns off the transmitter of the base station corresponding to the low power channel.

The trunking card architecture and operation with the site controller, being relevant to the present invention, are described in conjunction with FIG. 3. Each trunking card (TC) includes a TC microprocessor 256 and associated random access memory (RAM) 258, a multiplexer 260, and a modem 262. TC microprocessor 256 executes software stored in random access memory 258 (which is preferably nonvolatile) in order to implement various control functions including "failsoft" modes of operation. TC microprocessor 256 transceives digital control signals to/from its associated base station transceiver via modem 262 and dedicated serial control line 264. For example, the TC microprocessor keys and unkeys the associated base station transmitter, controls the base station transmitter and receiver to process audio or digital signals, and disconnects power from the base station transceiver in order to conserve energy.

Each trunking card TC has three serial ports A, B, and C. Typically, multiplexer 260 selects only one of the received ports A, B, C to be monitored by the trunking card at any time with the select input of the multiplexer being controlled by microprocessor 256. Port A is connected to primary site controller 250 via dedicated parallel control bus 216(1). Port B is connected to an alternate site controller via similar control bus. However, in the present invention, port B is not used because a data switch 520 (described in detail in the detailed description) connected to port A is used to select which site controller to use. Port C is connected to the backup serial link (BSL) 228 which interconnects all of the trunking cards in daisy chain fashion. When the multiplexer 260 selects port A during normal operation, the trunking card processor 256 receives control messages from primary site controller 250 and also sends status messages to the primary site controller as well as to any alternate site controller via port B. In this way, the alternate site controller is constantly updated with status change information and can immediately take over control of the system if the primary site controller fails.

All or most control functions are performed by the primary site controller 250 which executes multitasking, event-driven software to provide advanced control functions such as call logging, dynamic regrouping, as well as simple control functions such as receiving channel requests, making trunking channel assignments, recording confirmed and dropped calls, handling priority calls and the like. For a more detailed description of these functions, reference is made to U.S. Pat. No. 4,905,702 entitled "Trunked Radio Repeater System" assigned to the assignee of the present invention the disclosure of which is incorporated herein by reference.

During normal system operation, the trunking card microprocessor 256 generally simply passes received digital control signals onto the primary site controller 250, passes digital control signals to be transmitted from the primary site controller 250 to its base station transceivers, and performs various other operations (e.g. initiate transmissions, unkey its associated base station transmitters, and the like) directly in response to control signals sent by the primary site controller 250. During normal operations, TC microprocessor 256 devotes most of its processing resources to processing signals received by its base station repeater receiver and signals to be transmitted by its base station repeater transmitter.

Also during normal system operation, the backup serial link 228 is not used. Independent operations of various trunking cards are coordinated by the primary site controller 250, and signal processing operations performed by the various trunking cards are loosely synchronized by synchronization signals produced by one of the trunking cards currently assigned as the control channel. These synchronization signals, e.g., regular sync pulses generated every 30 msec, are communicated to the rest of the trunking cards via frame sync control link (FSL) 226. Frame sync control link 226 is a single line that connects all of the trunking cards together in daisy chain fashion. This control line is used by whichever trunking card is assigned to the control channel to notify all other trunking cards of the beginning of each control channel slot on the outbound (i.e. from base station to the radios) control channel.

Accordingly, one of the trunking cards and its associated base station transceiver operate on the predetermined full duplex control communications channel. This control channel is monitored by radio units whenever they are not actually engaged in communications performed on working channels assigned to the other trunking cards. The control channel is time division multiplexed into a sequence of frames. Outbound control channel signals are continuously transmitted by the control channel base station transmitter. Radio units monitoring the control channel synchronize with the frame synchronization signals transmitted continuously on the outbound control channel which reduces the time required by the radio units to synchronously receive and transmit control channel signals.

The trunking card assigned to supervise control channel operations originates the control channel frame synchronization timing signals and places those signals on frame sync control link 226 as well as passes them to its associated control channel base station transmitter for transmission on the outbound control channel. Each of the trunking cards continuously monitors the frame sync control link 226, and the microprocessors of each trunking cards synchronize signal processing functions with the regularly transmitted pulses on the frame sync control link 226. In this way, when a radio unit receives a command transmitted on the outgoing control channel to change frequency to a working channel, the radio unit is already synchronized with the control channel timing.

To ensure a very high state of reliability, the trunked communications system 100 can be operated in a "failsoft" mode of operation. For a detailed description of such failsoft operation, reference is made to U.S. Pat. No. 5,175,866 entitled "Fail-Soft Architecture For Public Trunking System," assigned to the assignee of the present invention, the disclosure of which is incorporated explicitly here by reference. Briefly, when the trunking system 100 begins operating in the failsoft mode, multiplexers 260 of all trunking cards select port C and the backup serial link 228 becomes active. The trunking cards cease passing signals to and receiving signals from the primary site controller 250, and instead, trunking and other functions are performed in a distributed fashion by the trunking cards with signals being communicated between the trunking cards via the BSL 228. The control channel trunking card performs the supervisory role and uses various polling techniques to respond to working channel request messages and to assign working channels if available. Accordingly, reliable trunked communications are ensured even if the site controller is inoperable or if no site controller is used.

Thus, the trunked radio communication system described above provides a very reliable trunked radio communications system for a single site where all of the base stations, trunking cards, console, and the site controller are located at a single location. However, there are situations where it is desirable to "split" the site so that there are base station repeaters at two or more remote locations but nonetheless operate all of those base station repeaters at those locations as a single site system. For example, a single site system having fourteen channels (corresponding to fourteen base station transceivers) might be divided into two locations physically separated for example by hundreds or thousands of feet with each location being referred to as a split site location. At one split site location, eight base station repeaters would provide eight radio channels, and at the other split site location, six base station repeaters would provide six radio channels. Ideally, even though the base station equipment is physically divided into two split locations, the trunked communication system would still operate as a single fourteen channel single site system under the supervising control of one site controller located at either one of the site locations.

This split location, single site trunked radio architecture, to the knowledge of the inventors, is an entirely new concept. For example, base stations in existing single site systems can currently only be separated by no more than 50 feet and therefore do not offer split site location capabilities. Nor have problems such as maintaining data integrity and system synchronization for single site trunking system equipment physically separated by significant distances been either addressed or resolved. There is also the problem of how to control and manage split site locations and implement a failsoft mode of trunked radio communications. For example, how will information be transmitted between each of the base station transceivers (via their respective trunking cards) and a remote site controller over corresponding control data buses? Similarly, how will information be sent over the frame sync link and, in the failsoft mode of operation, over the backup serial link? There is also the problem of how to monitor RF power for the split location, single site system. For example, how does a single power monitoring unit at one of the site locations monitor and test the RF output power of all base station transmitter channels for both split site locations?

The present invention provides a split site trunked communications system to permit trunked RF communications between plural portable radios located at those split sites. A first trunked RF communications site is located at a first site location and includes plural first base stations, each first base station including a transceiver corresponding to an RF communications channel. The first site also includes a first site controller for assigning base station transceivers to radios requesting an RF communications channel. A second trunked RF communications site is located at a second site remote from the first site and includes plural second base stations along with a second site controller. A communications link links the first and second trunked RF communication site so that they function as a single site trunked radio communications system with only one of the first and second site controllers assigning the first and second base station transceivers to radios requesting RF communications channels. The other of the first and second site controllers is a redundant, backup site controller that can assume operation of the first and second trunked RF communications sites as a single site system should the primary site controller for example be disabled. Thus, the single acting site controller controls base stations at both the local and remotely located sites using the communications link.

In one embodiment the communications link includes a fiber optical cable, with first and second fiber optic driver/receivers connected at respective ends of the fiber optic cable. First and second time division multiplexers, connected to the first and second fiber optic drivers, convert control and audio information from the first and second sites into a TDM serial data stream and transmitting the data stream over the fiber optic cable via the first and second fiber optic driver/receivers. The communications link may also include a separate control link that links particular control signals like synchronization signals to each of the first and second base stations.

The control link includes novel link extension circuitry that automatically senses which site is sending the control signals and reconfigures the control link to permit transmission by the transmitting site location on the communications link over considerable distance to the receiving site location. Such circuitry permits signal transmissions to be transmitted over the link from both sites without collision.

The architecture of the present invention is such that should both the first and second site controllers fail or otherwise be absent, the first and second remotely located base stations are operated as a single site in a failsoft mode of operation. In that instance, the base station operating as the control channel controls the RF trunking operations for all the base stations, both local and remote, utilizing the communications link.

This new architecture provides an unprecedented level of redundancy with only a marginal increase in actual equipment. The architecture of the present invention permits a split site location to be completely disabled through loss of power or intentional disruption with the remaining split site location(s) continuing to function with only a loss in system capacity. That loss is unnoticed by a system user because communications via the remaining split site locations continue without interruption. These features of course are highly desirable for strategic command centers or vital communication centers. The ability to operate with significant spacial separation between base stations using only one site controller provides excellent protection against both manmade and natural disasters that can disable a specific location which are significant concerns to both public safety and emergency management systems. The architecture of the present invention also permits easy and inexpensive expansion of an existing trunked radio communication system without being constrained by the same physical location of the existing system. In other words, additional capacity could be provided within a new location in the same building or an entirely different location, e.g. an entirely different building.

In a single site, split location trunked radio communication system of the present invention, all assets are fully utilized during normal operation. This contrasts with traditional redundant main and backup systems where the backup assets are not utilized during normal operation. Thus, to provide fourteen channel capacity with full backup, for example, the traditional redundant system requires at least twenty-eight base stations. The present base invention provides a highly reliable fourteen channel system using only fourteen base stations.

These as well as other features and advantages of this invention will be more completely understood and appreciated by carefully studying the following detailed description of the presently preferred embodiments taken on conjunction with the accompanying drawings.

DETAILED DESCRIPTION OF THE DRAWINGS

In the following description, for purposes of explanation and not limitation, specific details are set forth, such as particular circuits, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the invention with unnecessary details.

Figure 1:
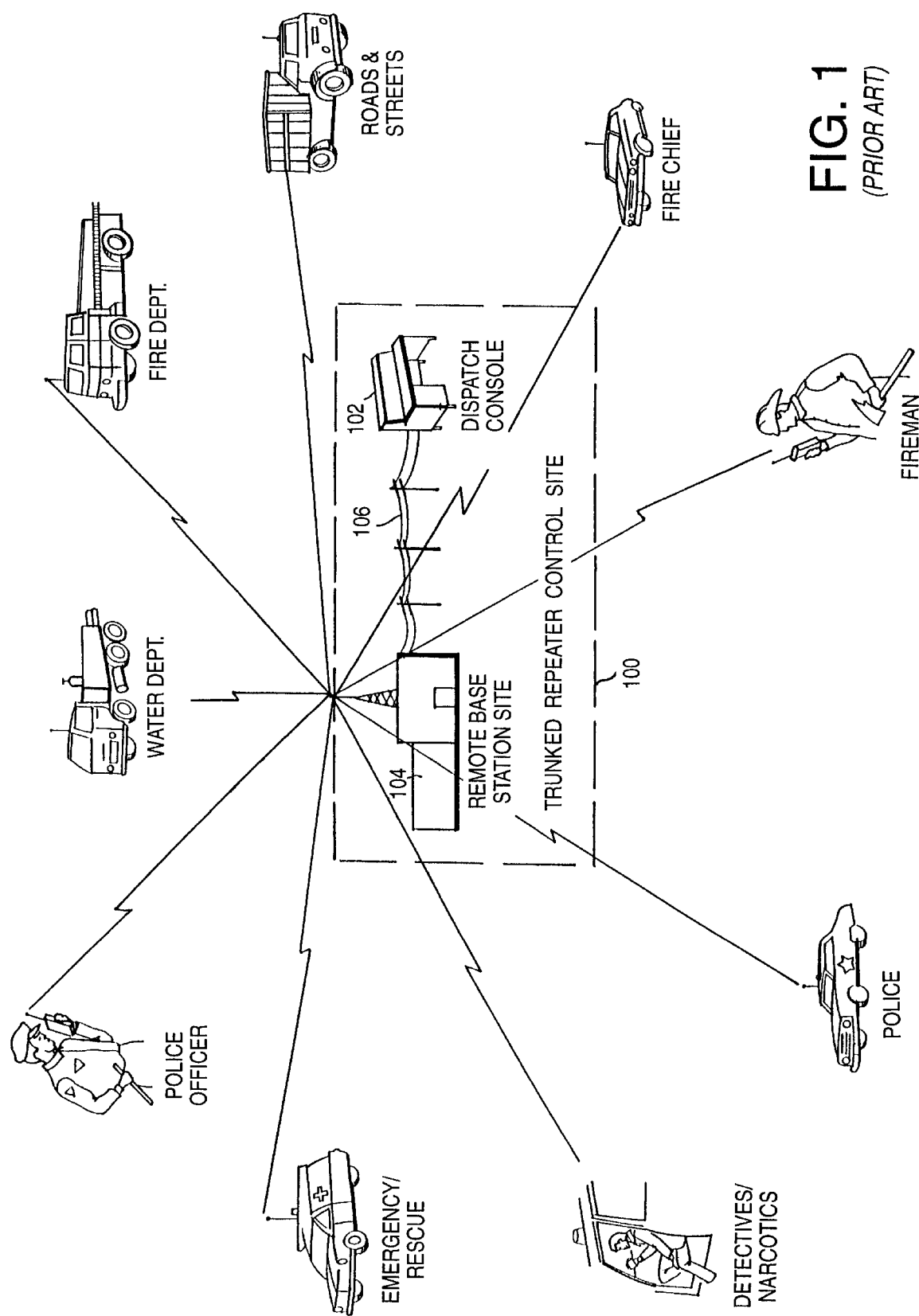
FIG. 1 is a general explanatory diagram of a trunked radio repeater system.
Figure 2:
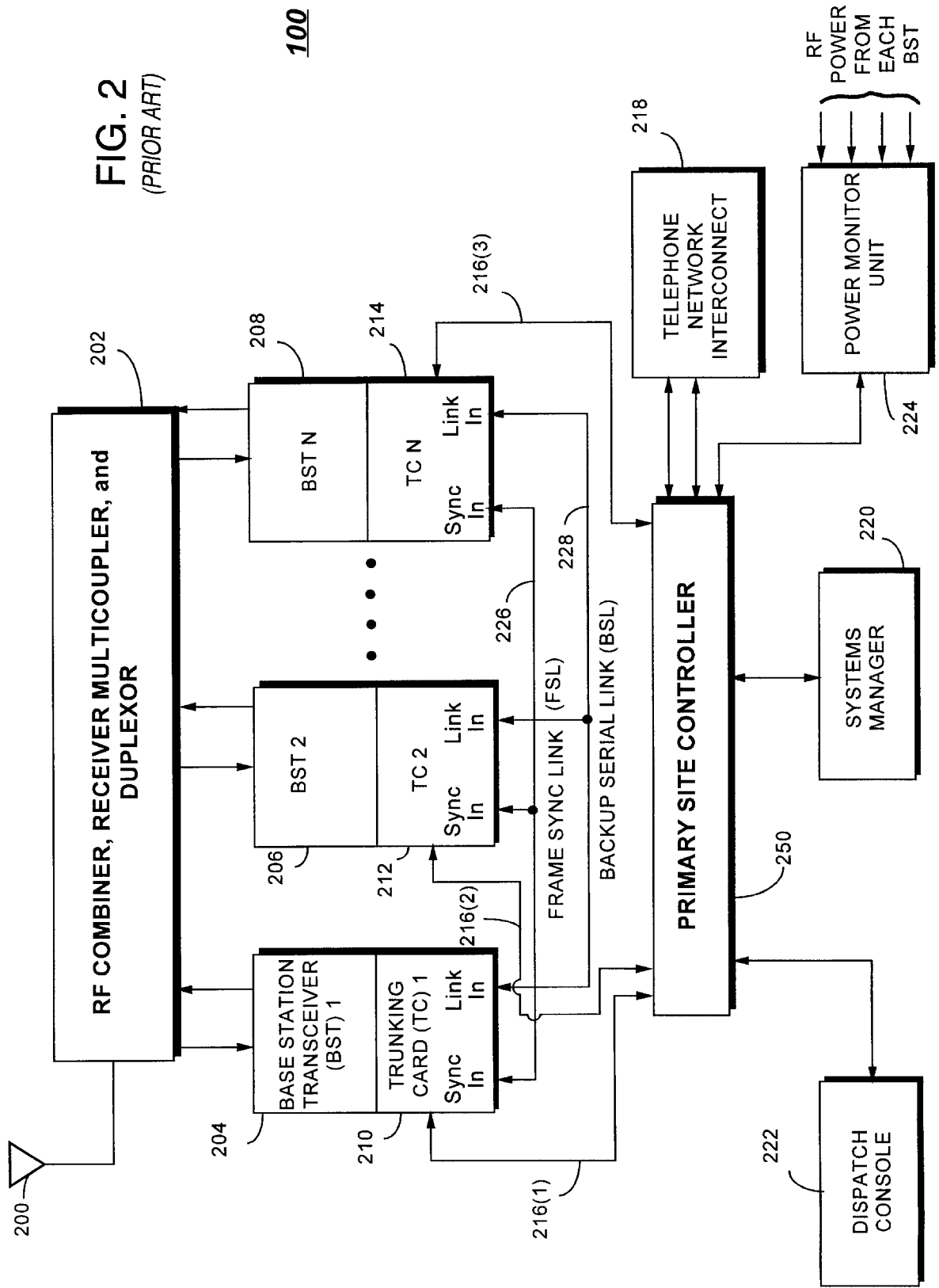
FIG. 2 is a simplified block diagram of a centrally located single site in the trunked repeater system of FIG. 1.
Figure 3:
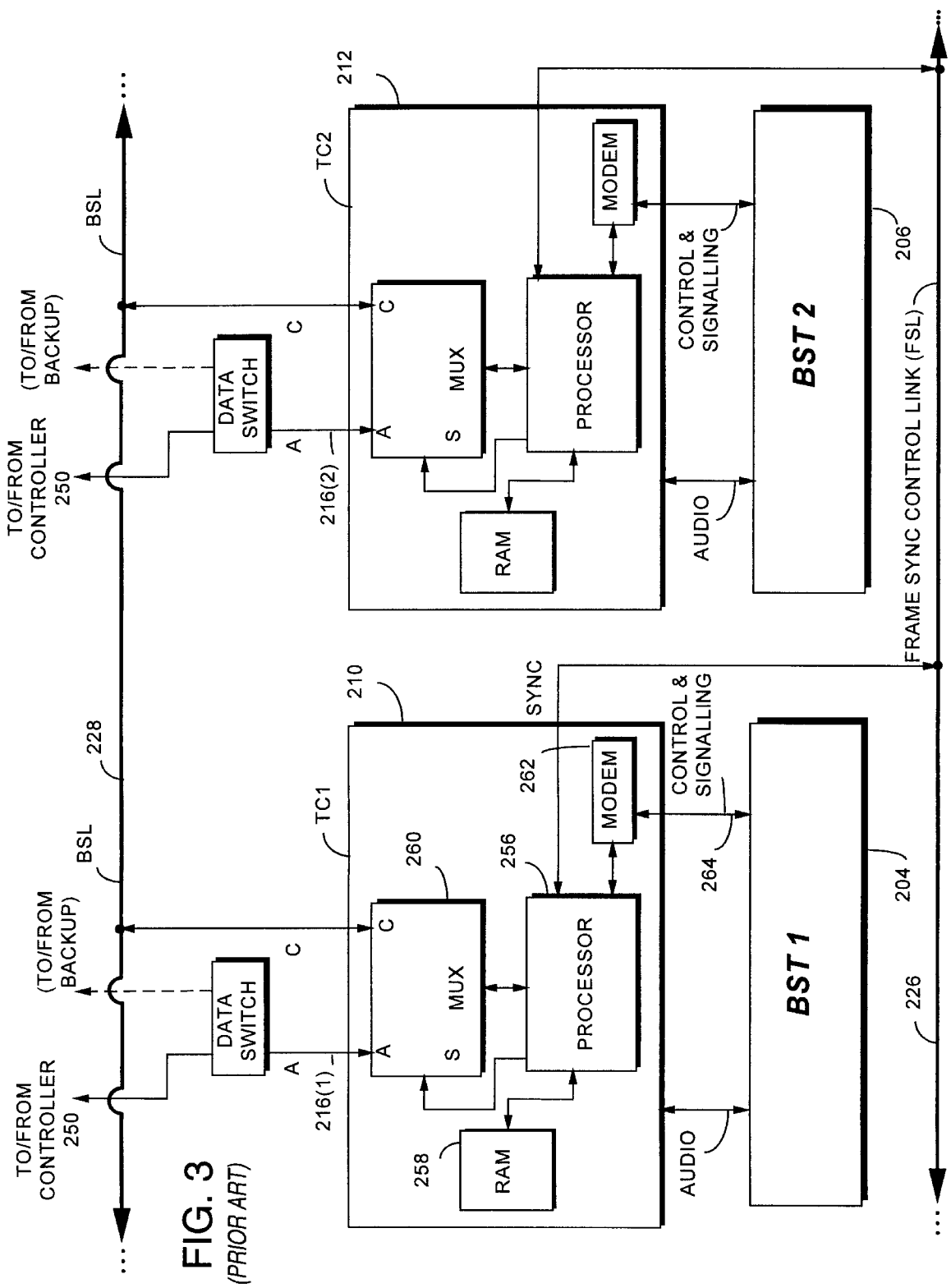
FIG. 3 is a simplified block diagram of channel trunking cards used to control the base stations of the central site architecture shown in FIG. 2.
Figure 4:
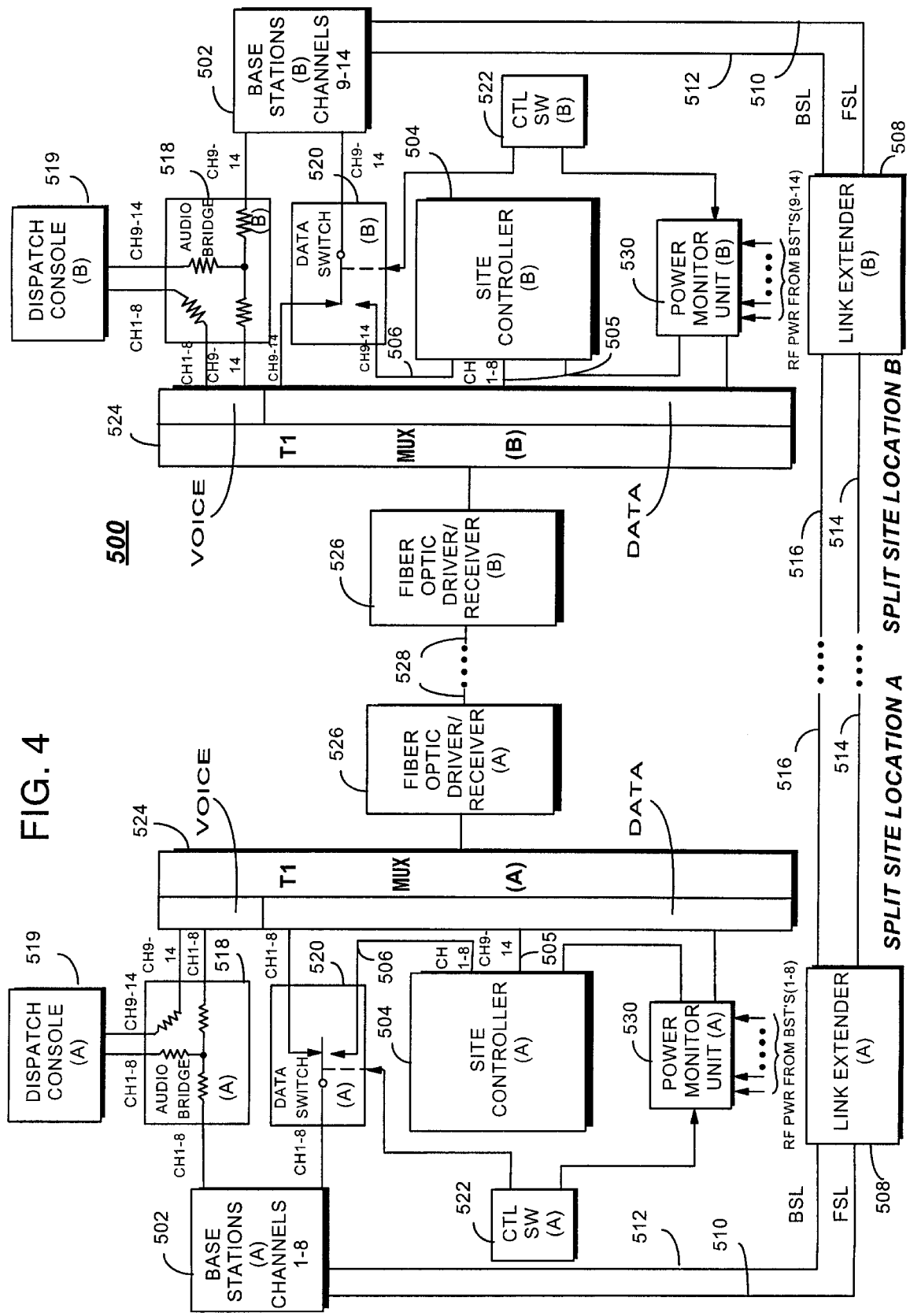
FIG. 4 is a simplified block diagram of a single site, split location RF trunked communication system in accordance with the present invention.

FIG. 4 shows a block diagram of a single-site, split-location RF trunked communication system 500 in accordance with the present invention. The split site location (A) houses eight base stations each base station including a trunking card, transceiver, and the like similar to base stations and are configured as generally described above in conjunction with FIGS. 2 and 3 for a single site trunked radio repeater system and as described in further detail in U.S. Pat. Nos. 4,905,302 and 5,175,866 previously incorporated by reference. To simplify the description, however, that description is not repeated here. These eight base stations at split site location (A) correspond to radio frequency channels (1–8). Split site location (B) houses six base stations (B) corresponding to RF channels (9–14). Obviously, any number of base stations could be located at each split site location to achieve any desired total number of RF channels. In addition, although two split site locations (A) and (B) are shown, more than two such locations could also be coordinated and operated in accordance with the present invention as a single site. To further simplify the description, only the function blocks in split site location (A) are described with the understanding that similar hardware is located used at split site location (B).

Dispatch console 519 is connected to an audio bridge 518 and to a time division multiplex (TDM) multiplexer 524. The audio bridge 518 is essentially a large resistive network that takes audio signals (analog or digital) to/from the console 519, impedance matches those signals and provides them to/from local base stations (A) as well as to the remote base stations (B) and to the remote console (B) through the multiplexer 524. In this way, the dispatch console at the local split site location may participate in audio communications on any of radio channels (1–14).

The TDM multiplexer 524 may be a T1 multiplexer, (T1 corresponding to 24 time division multiplexed, time slot type channels), which is conventional off-the-shelf equipment and in this example may be Model No. TDM-163 manufactured by Intraplex Inc. Of course, a larger TDM multiplexer or plural TDM multiplexers could be used to service a larger number of radio channels and/or control signals. The T1 multiplexer 524 takes multiple, full duplex digital and/or analog data streams including audio information and control information and, using time domain multiplexing, converts those streams into consecutive time slots in one high speed data stream as is well known in the art.

The T1 multiplexer 524 connects with a commercially available fiber optic driver/receiver 526, e.g., the T1 single fiber loop converter model number F1544-10 DS1 SFLC available from ADC Telecommunications Inc. Fiber optic driver/receiver 526 includes among other things an LED light source and a photodiode detector. To transmit, the fiber optic driver/receiver 526 converts the electrical, high speed data stream from the T1 multiplexer into corresponding light energy suitable for transmission over fiber optic links. The driver is full duplex and therefore can transmit and receive at the same time. The photodiode detects light energy received over the fiber optic link and converts that received light into corresponding electrical signals. If desired, redundant fiber optic links could be used with an optical switch at each split site location to route the information to/from the appropriate fiber link.

A data switch 520, connected by twisted pair lines between each of the local base stations 502, the T1 multiplexer 524, and the site controller 504, is essentially a large switch that permits data and control information over each of the lines to/from the base stations 502 to be passed to/from either the local site controller 504 or the T1 multiplexer 524. Referring back briefly to FIG. 3, control information from each base station trunking card is connected to the data switch 520 over bus lines 216. Thus, the data switch accommodates each of the base station channels 1–14 and provides additional lines or "channels" dedicated to control signals. In essence, the data switch is a multiple pole, double throw switch that is controlled by control switch 522. Such a data switch may be for example the SM-500 series ganged switch sold by Black Box Corporation.

In addition to being connected to the data switch 520, control switch 522 is connected to a local power monitor unit 530. Control switch 522 may be a simple, manually-operated switch that generates a signal that either selects the site controller A at site location A or the site controller B at site location B to function as the single site controller for both split sites. If the local site controller is selected, the control switch 522 is set to send a signal to the data switch at both split site locations to have each TC microprocessor select its A port (see again FIG. 3). The data switches 520, being set in accordance with the control switch signal, direct signals between the site controller and its local base stations via relatively short wire connection and between the site controller and remote base stations via relatively long fiber optic link 528. Of course, the function of control switch 522 could be automatically performed, e.g., by setting a select flag or bit.

Therefore, the control switch 522 and data switch 520 determine which site controller is to operate the base stations at the split site locations as a single site. The data switch 520 is set by the control switch 522 to route signals from local base stations either over the fiber optic link 528 to the remote site controller or directly to the local site controller.

Figure 5:
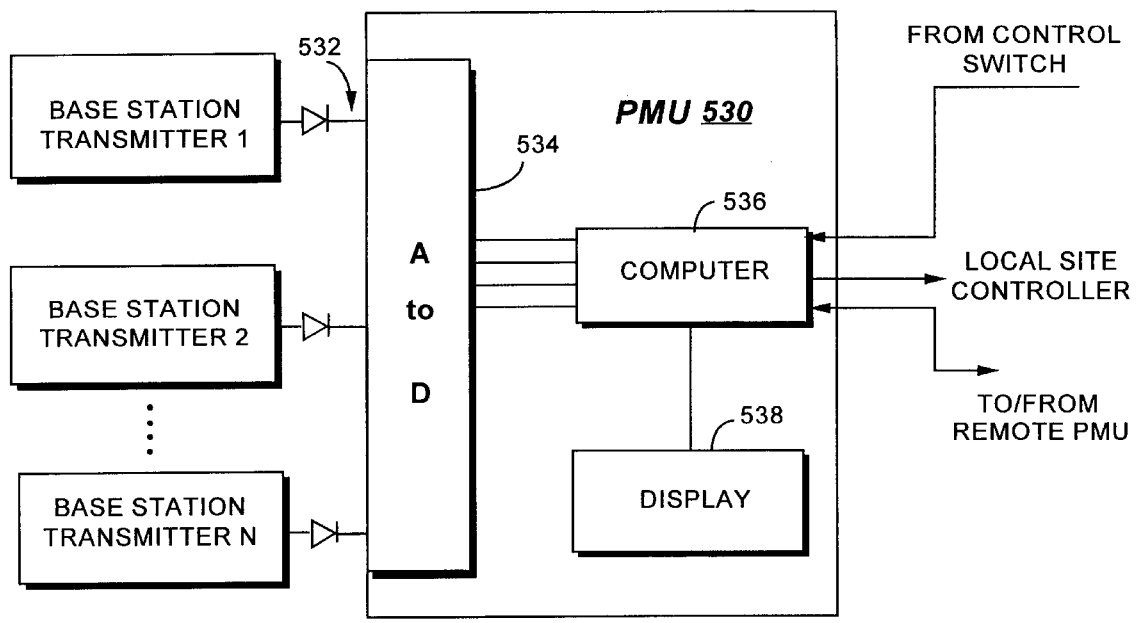
FIG. 5 is a simplified block diagram of a power monitoring unit used in conjunction with the present invention.

Referring to FIG. 5, power monitor unit (PMU) 530 includes a computer 536 which may include an Intel 80486 microprocessor with suitable disk memory and analog-to-digital (A to D) conversion circuitry 534 and a display 538 connected to the computer 536. Conventional diode detection circuitry referred to generally at 532 detects RF power transmitted from each active local base station transmitter. An analog signal proportional to RF power is converted into a digital value by A to D conversion circuitry 534. The computer 536 compares the received digital values to a minimum threshold.

The computer 536 detects from a signal generated by the control switch 522 which site controller is operating the split site system. For any local base station transmitters transmitting at powers below the threshold, the computer 536 sends an alerting signal to the local site controller if it is in charge. However, if the remote site controller is in charge, the computer 536 transmits these alerting signals to remote site location PMU via the Ti multiplexers and communications link. Thus, the PMU at the split site location where the site controller currently in charge receives and stores all power monitoring information for all active base station transmitters in the system and sends low power alert messages to that site controller to permit the site controller to take any necessary action such as dropping the channel.

As described above in conjunction with FIGS. 2 and 3, the trunking card of each base station is connected to frame sync link (FSL) 510 and backup serial link (BSL) 512. In the embodiment of the present invention being described in conjunction with FIG. 4, each of these links is also connected to a link extender circuit 508 which transceives serial data from the frame sync link (FSL) 510 and backup serial link (BSL) 512 over twisted pair communication links 514 and 516 dedicated to the FSL and BSL, respectively, and connected to the remote split site location (B). Using twisted wires, the link extenders (A) and (B) at split site locations (A) and (B) may be separated by up to ten thousand feet and this limitation being primarily due to the bandwidth restrictions of a twisted wire pair communications path. Other communications media which have greater distance capabilities could also be used assuming bandwidth and data reliability requirements are met For example, the FSL and BSL data could be routed through the Ti multiplexers over the same fiber optic link 528 or separate fiber optic link. Fiber links do not have the limitations of twisted pair wires and therefore the link extenders could be separated by much greater distances. As will be described in further detail below in conjunction with FIG. 7, a significant feature of the link extension circuitry is that it automatically senses which split site location is currently transmitting control channel data and automatically configures itself to permit that transmission and block transmissions from the remote split site location.

Figure 6:
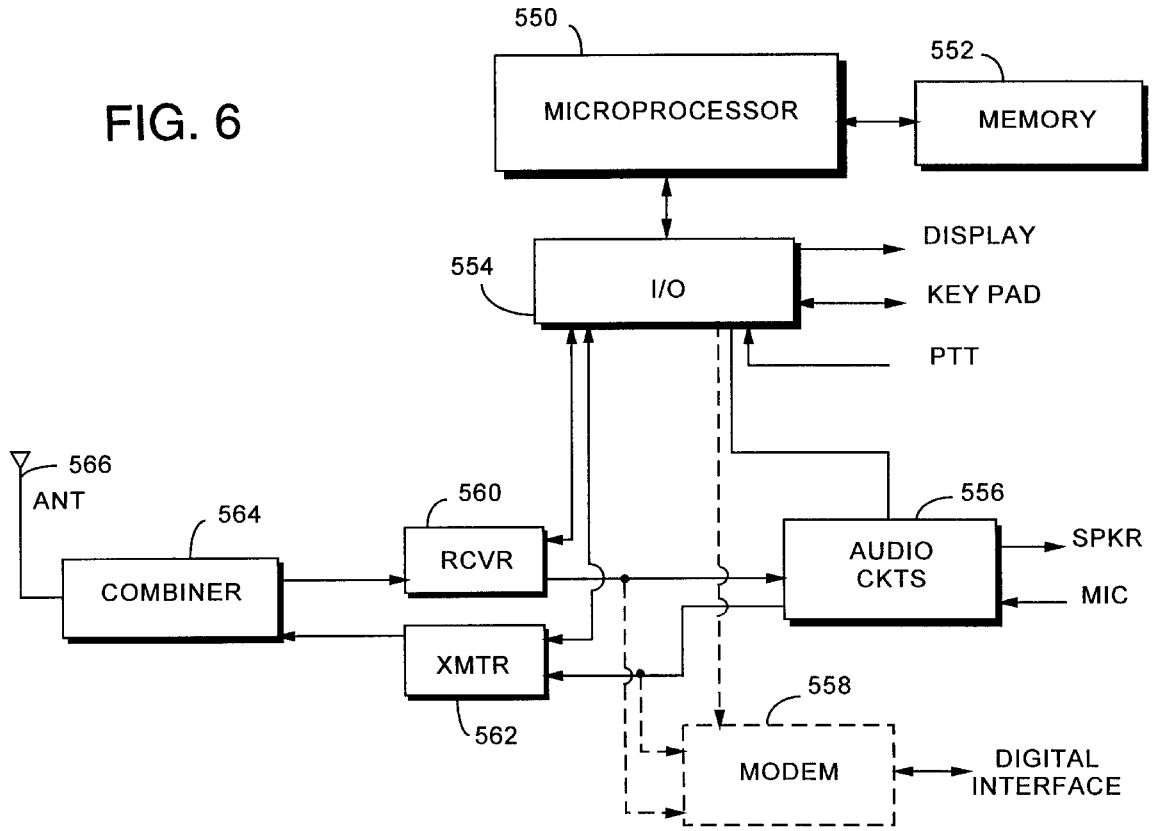
FIG. 6 is a simplified block diagram of a mobile/portable radio unit that may be utilized for communication within the single-site split-location trunked repeater system in FIG. 4.

The general architecture of a suitable mobile/portable radio unit for use with the present invention may be microprocessor based as depicted in FIG. 6. Here microprocessor 550 is provided with suitable memory 552 and input/output circuits 554 so as to interface with the radio unit display, keypad, push-to-talk (PTT) switch as well as audio circuits 556 which provide basic analog audio outputs to the speaker and accept analog audio inputs from the microphone. Auxiliary control over a modem 558 as a digital interface to voice encryption, vehicle location, or other types of digital communications subsystems may also be provided if desired. Of course, the I/O circuits 554 also permit suitable programmed control over RF receiver 560 and transmitter 562 which via conventional signal combiners 564, provide two way fully duplexed communication over a common antenna 566 as will be appreciated by those skilled in the art.

Figure 7:
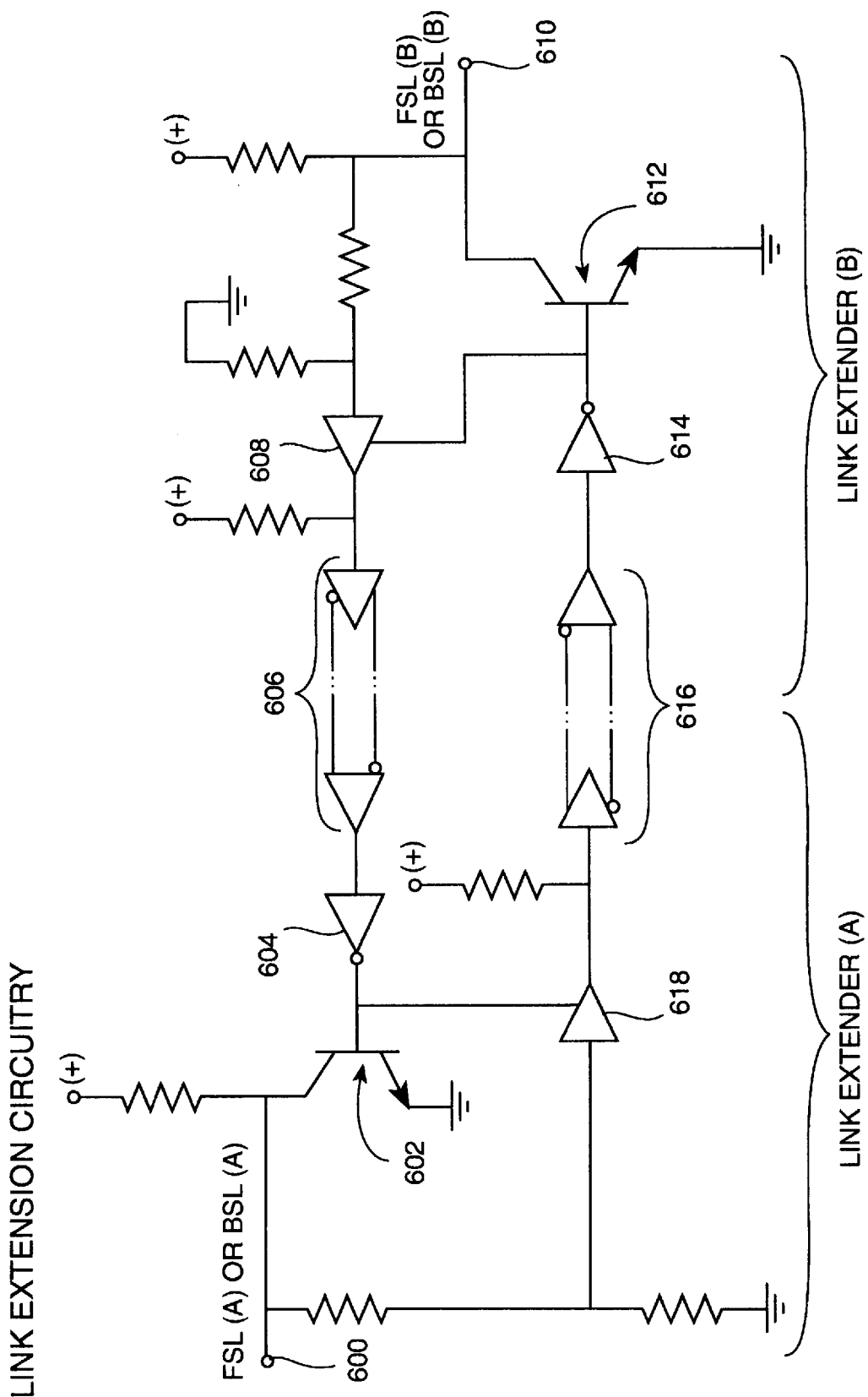
FIG. 7 is a more detailed schematic drawing of the link extender used in conjunction with the present invention.

A more detailed description of the link extension circuitry 508 is now provided in conjunction with FIG. 7. Although only one link extension circuit is shown, both the FSL and BSL links include their own link extension circuitry. The link extender (A) at split site location (A) includes a transmit/receive port (A) 600 connected to the frame sync link (A) or the backup serial link (A). Port 600 is connected directly to the collector of transistor 602 and via a voltage divider to the input of a tristate buffer 618. The collector of transistor 602 is also connected via resistor to a positive power supply. The base of transistor 602 is connected to an enable port of the tristate buffer 618. When enabled, the tristate buffer 618 passes transmit data at port 600 to a differential driver and receiver amplifier pair 616 connected together by a shielded, twisted pair of communication lines. The differential data at the differential receiver amplifier is inverted in an inverter 614, the output of which is connected to the base of transistor 612. The collector of transistor 612 (connected to a power supply) provide an output signal at transmit/receive port (B) 610.

The transmission path from port (B) 610 to port (A) 600 is similar in that FSL(B) or BSL(B) signals to be transmitted from port (B) 610 are passed through a voltage divider to tristate buffer 608. The base of transistor 612 is also connected to an enable port of tristate buffer 608. When tristate buffer 608 is enabled, the serial information at port (B) is transmitted via differential driver/receiver amplifier pair 606 and communication lines, inverted at inverter 604, and amplified at transistor 602 which provides the received output at port (A) 600.

The operation of the link extension circuitry will now be described using the example of transmitting a frame sync pulse FSL(A) present at port (A) 600 over the communications link. In this example, the differential link 616 is the active transmissions path and differential link 606 is the inactive transmission path. When the frame sync pulse occurs with a high to low voltage level transition, it is passed through normally enabled tristate buffer 618, sent along differential link 616, and inverted to a high logic level at the output terminal of inverter 614. This high output level of inverter 614 disables the tristate buffer 608 which prevents any signals from being transmitted on the other differential link 606 going in the opposite direction. In this way, data collisions are automatically prevented at transmit/receive ports 600 and 610, i.e., a port receiving cannot simultaneously transmit. Transistors 612 and 602 are simply voltage level converters which take the logic high output from their respective inverters at a first voltage level, e.g. five volts, and raise it to the voltage level of the collector power supply, e.g. twelve volts, for use by the trunking cards of the remote base stations.

For a similar frame sync pulse transmitted at port 610, on the differential link 606 in the opposite direction (split site B to A), buffer 618 is disabled by a high logic level at inverter 604 and therefore blocks transmission of any input data at port 600. Thus, the link extension circuitry in accordance with the present invention automatically configures itself either to transmit or receive and automatically ensures that there are no data collisions in an attempt to simultaneously transmit and receive from at either terminal in split site locations A and B.

The overall operation of the single site split location trunked communication system will now be described. The control switches in both split site locations A and B are set to select which site controller is in charge. Assume for the sake of explanation that site controller A is in charge of the split site system. The base stations (A) corresponding to radio channels 1–8 are therefore controlled in the same fashion as described above and in more detail in U.S. Pat. No. 4,905,302. The dispatch console at site location (A) participates in radio communications on channels 1–8 in the same fashion as in a conventional single site trunk repeater system except that these local communications are routed through audio bridge (A). Moreover, monitored RF power from local base station transmitters 1–8 is accomplished by the power monitor unit (A) with corresponding power signals being sent directly from the power monitor unit (A) to the site controller (A).

Dispatch console (A) can also participate in communications on remote channels 9–14 located at split site location (B). Audio signals are routed from base station channels 9–14 through the audio bridge (B) to the T1 multiplexer (B) and transmitted in time division multiplex format over the fiber optic link to the T1 multiplexer (A) via fiber optic driver/receivers (A) and (B). The T1 multiplexer (A) routes the audio through the audio bridge (A) to dispatch console (A). Communications from dispatch console (A) are routed in the opposite path for transmission over channels 9–14.

Control signals between site controller (A) and remote base stations (B) will now be described. Control channel information such as working channel requests from a base station to the site controller (A), working channel assignments from the site controller (A) to the control channel base station and an available working channel base station, working channel confirmation and drop messages from the working channel base station to the site controller A are handled in two different scenarios. Assume for the first scenario that one of the base stations (A) is designated as the control channel base station. Control messages such as those described above are sent from the site controller over line 506 through the data switch 520 to the control channel base station. That information is transmitted over the RF control channel via T1 multiplexer (A), fiber optic communications link 528, T1 multiplexer (B), and data switch (B) to base stations 9–14 at split site location (B). Working channel assignments are communicated directly to remote base station 9–14 from site controller (A) following a similar path. Status signals from the remote base stations (B) are routed to the site controller (A) through data switch (B), T1 multiplexer (B), communications link 528, T1 multiplexer (A), and hardwire link 505.

As described above, power monitor unit (A) also receives detected RF power signals from power monitor unit (B) through the fiber optic link and multiplexing circuitry and routes the necessary power monitor information for base stations and split site locations (A) and (B) to site controller (A). If there becomes a need to operate the single site split location trunked radio communication system using site controller B, the control switches at each split site location would be switched accordingly so that the appropriate signal routing occurs.

As described above, each of the base station trunking cards in the local and remote split site location are kept in loose synchronization via frame sync pulses sent out regularly by the control channel base station over the frame sync link (FSL) through the link extenders A and B over the frame sync link bus 514.

A significant advantage of the present invention is that the single site split location trunked radio communication system can operate as a single site in failsoft mode to continue trunking operations without a site controller in accordance with the procedures outlined in U.S. Pat. No. 5,175,866. Once the split location, single site trunking system enters a failsoft mode, the multiplexers in all of the trunking cards in base stations (A) and (B) automatically select port C, and the backup serial link (BSL) 512 is activated. Thinking and other functions are then performed in a distributed fashion by the trunking cards with signals being communicated between the trunking cards via the BSL communications links and link extenders A and B. The control channel base station trunking card at one of the split site locations performs the supervisory role using various polling techniques to respond to working channel request messages and to assign base station working channels if available. Accordingly, reliable single site split location trunked radio communications are ensured even if site controllers A and B are inoperable (or if the system is intentionally operated without a site controller).

Thus, the present invention provides a single site, split location trunked radio communication system that operates in a fashion which makes "transparent" the split nature of the system. Even though some of base stations are spaced a remote distance from the site controller, all of the base stations at both split sites can be accessed and assigned just as in the single site scenario. This architecture is transparent because the single site split location system can be achieved without changing the hardware of existing base station transceivers, trunking cards, control and data buses, site controllers, or the radio units. Moreover, the various control and working channel protocols which have been established for a single site can be used without modification.

Thus, even if a split site location is completely disabled through loss of power or intentional disruption, the remaining split site location(s) continues to function with only a loss in system capacity. The ability to operate spatially separated base stations using only one or the other site controller (or no site controller in failsoft mode) provides excellent protection against both manmade and natural disasters that can disable a specific split site location. Even if the local site completely failed and was nonoperational, the remote split site would continue to function to maintain trunked communications. The architecture of the present invention also permits easy and inexpensive expansion of an existing trunked radio communication system Moreover, in the single site, split location trunked radio communication system of the present invention, all assets are fully utilized during normal operation in contrast to traditional main and backup systems which include fully redundant assets where the backup assets are not utilized during normal operation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A trunked RF communications repeater system providing an RF control channel and plural trunked RF working channels for temporary assignment in response to control signals passed over the RF control channel, comprising:
   a first repeater architecture located in a first, split-site location and including:
   plural first base station transceivers, each first base station transceiver corresponding to an RF communications channel, and
   a first site controller, connectable to each of the first base station transceivers, for assigning base station transceivers to radios requesting an RF communications channel; and
   a second repeater architecture located in a second, split-site location remote from the first, split-site location and including:
   plural second base station transceivers, each second base station transceiver corresponding to an RF communications channel, and
   a second site controller, connectable to each of the second base station transceivers, for assigning base station transceivers to radios requesting an RF communications channel; and
   a communications link linking the first and second repeater architectures,
   wherein the first and second repeater architectures are capable of functioning in a first mode as a single site with one of the first and second site controllers assigning both first and second base station transceivers to radios requesting an RF communications channel during which time the other of the first and second site controllers does not assign base station transceivers to radios requesting an RF communications channel, and
   wherein the first and second repeater architectures are capable of functioning in a second, failsoft mode in which the first and second base station transceivers are assigned to radios requesting an RF communications channel using control signals passed between the first and second repeater architectures when the first and second site controllers fail or are absent.

2. The trunked RF communications system according to claim 1, wherein in the first mode the other of the first and second site controllers may be switched to operate the first and second trunked RF communications sites as a single site if the one site controller is disabled.

3. The trunked RF communications system according to claim 1, wherein in the second, failsoft mode, the first and second repeater architectures function as a single site under the control of one of the base station transceivers from the first and repeater architectures.

4. The trunked RF communications system according to claim 3, wherein the one base station transceiver functions as the RF control channel.

5. The trunked RF communications system according to claim 4, wherein the control channel base station transceiver assigns working channels to RF transceivers corresponding to the first and second repeater architectures in response to requests for a working channel.

6. The system in claim 3, wherein the communications link includes a backup serial link, and wherein the one base station transceiver transmits over the communications link control signals including synchronization signals to other base station transceivers included in the first and second repeater architectures.

7. A method for controlling a trunked radio communications repeater system that provides an RF control channel and plural trunked RF communications channels for temporary assignment in response to control signals passed over the RF control channel, comprising the steps of:

providing a first group of repeaters connectable to a first site controller at a first, split-site location and capable of controlling trunking-related operations of the first group of repeaters;

providing a second group of repeaters connectable to a second site controller at a second, split-site location remotely located from the first, split-site location, and capable of controlling trunking-related operations of the second group of repeaters;

operating the first and second groups of repeaters in a first mode as a single site with one of the first and second site controllers assigning both first and second repeaters to radios requesting an RF communications channel during which time the other of the first and second site controllers does not assign repeaters to radios requesting an RF communications channel; and operating the first and second groups of repeaters in a second mode as a single site to control the trunking-related operations of the first and second group of repeaters when the first and second site controllers fail, are unavailable, or are absent.

8. The method in claim 7, wherein in the second mode one of the repeaters of the first and second groups controls the trunking-related operations of the first and second groups of repeaters.

9. The method in claim 8, wherein the one repeater functions as the RF control channel.

10. A method of operating a radio communications system that receives and transmits on plural radio transceivers, comprising the steps of:

separating a first set of base station radio transceivers and a first site controller at a first, split site from a second set of base station radio transceivers transceivers and a second site controller at a second, split site by a substantial distance;

connecting the first split site and the second split site by a communications link;

in a first mode, operating the first and second sets of base station transceivers as a single site with one of the first and second site controllers assigning both first and second base station transceivers to radios requesting an RF communications channel during which time the other of the first and second site controllers does not assign base station transceivers to radios requesting an RF communications channel; and in a second mode, operating a selected base station radio transceiver from the first and second sets of base station radio transceivers as a control channel to pass control signals to mobile and/or portable RF transceivers and communicating control signals including RF channel assignments from the selected base station radio transceiver to the first and second sets of base station radio transceivers.

11. The method in claim 10, wherein the first set of base station radio transceivers is connected to a dispatch console, the method further comprising:

routing audio signals from one of the second set of base station radio transceivers to the dispatch console.

12. The method in claim 10, wherein the radio communications system is a trunked radio communications system and the control signals are trunking control signals.

13. The method in claim 10, wherein the substantial distance is greater than fifty feet.

* * * * *